United States Patent
Tamura et al.

(10) Patent No.: US 10,339,928 B2
(45) Date of Patent: Jul. 2, 2019

(54) CONTROL DEVICE, CONTROL METHOD, PROGRAM AND INFORMATION STORAGE MEDIUM

(71) Applicant: Sony Interactive Entertainment Inc., Tokyo (JP)

(72) Inventors: Keigo Tamura, Tokyo (JP); Toru Ogiso, Tokyo (JP); Toshimasa Aoki, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/508,213

(22) PCT Filed: Aug. 27, 2015

(86) PCT No.: PCT/JP2015/074188
§ 371 (c)(1),
(2) Date: Mar. 2, 2017

(87) PCT Pub. No.: WO2016/063621
PCT Pub. Date: Apr. 28, 2016

(65) Prior Publication Data
US 2017/0287479 A1    Oct. 5, 2017

(30) Foreign Application Priority Data
Oct. 24, 2014    (JP) .................................. 2014-217762

(51) Int. Cl.
*G10L 15/22*    (2006.01)
*G06F 3/16*    (2006.01)
(Continued)

(52) U.S. Cl.
CPC ............ *G10L 15/22* (2013.01); *A63F 13/213* (2014.09); *A63F 13/215* (2014.09); *A63F 13/32* (2014.09);
(Continued)

(58) Field of Classification Search
USPC .................... 704/246, 247, 251, 252, 275
See application file for complete search history.

(56) References Cited

U.S. PATENT DOCUMENTS 5,632,002 A * 5/1997 Hashimoto ............. G06F 3/165
704/231
7,505,910 B2    3/2009 Kujirai
(Continued)

FOREIGN PATENT DOCUMENTS

JP    02272624 A    7/1990
JP    07140998 vA    6/1995
(Continued)

OTHER PUBLICATIONS

International Preliminary Report on Patentability and Written Opinion for corresponding PCT Application No. PCT/JP2015/074188, 16 pages, dated May 4, 2017.
(Continued)

*Primary Examiner* — Leonard Saint Cyr
(74) *Attorney, Agent, or Firm* — Matthew B. Dernier, Esq.

(57) ABSTRACT

Provided are a control device that prevents performance of a process different from a desired process in response to a voice input, a control method, a program, and an information storage medium. A voice acceptance section accepts voice. An output control section performs control such that voice accepted by the voice acceptance section is output to a program capable of performing a process using the voice. The output control section performs control such that if it is recognized that the voice accepted by the voice acceptance section represents given information, voice accepted by the voice acceptance section thereafter is not output to the program capable of performing the process using the voice.

6 Claims, 7 Drawing Sheets

(51) Int. Cl.
  *G10L 15/10* (2006.01)
  *G10L 15/28* (2013.01)
  *A63F 13/213* (2014.01)
  *A63F 13/215* (2014.01)
  *A63F 13/32* (2014.01)

(52) U.S. Cl.
  CPC ............ *G06F 3/16* (2013.01); *G10L 15/10* (2013.01); *G10L 15/28* (2013.01); *G10L 2015/223* (2013.01)

(56) References Cited

U.S. PATENT DOCUMENTS

| | | | |
|---|---|---|---|
| 8,023,666 | B2 | 9/2011 | Nakajima |
| 8,165,886 | B1 | 4/2012 | Gagnon |
| 8,264,422 | B1 | 9/2012 | Persson |
| 8,412,531 | B2* | 4/2013 | Sullivan ............ H04M 1/72519 345/156 |
| 8,781,837 | B2* | 7/2014 | Yamamoto .................. 704/270 |
| 8,903,728 | B2 | 12/2014 | Maeda |
| 9,256,396 | B2 | 2/2016 | Monson |
| 2004/0073493 | A1* | 4/2004 | Kato ...................... G06Q 30/02 705/500 |
| 2004/0260562 | A1 | 12/2004 | Kujirai |
| 2005/0159833 | A1 | 7/2005 | Giaimo |
| 2007/0021205 | A1 | 1/2007 | Filer |
| 2008/0107286 | A1 | 5/2008 | Nakajima |
| 2010/0318366 | A1* | 12/2010 | Sullivan ............ H04M 1/72519 704/275 |
| 2011/0075818 | A1* | 3/2011 | Vance .................... G10L 15/07 379/88.01 |
| 2011/0223893 | A1* | 9/2011 | Lau ........................ G10L 15/22 455/414.1 |
| 2013/0035942 | A1 | 2/2013 | Kim |
| 2013/0281987 | A1 | 10/2013 | Maeda |
| 2015/0066516 | A1* | 3/2015 | Nishikawa ................ F24C 7/08 704/275 |
| 2015/0134341 | A1 | 5/2015 | Tamura |
| 2015/0350421 | A1* | 12/2015 | Lau ........................ G10L 15/22 455/415 |
| 2015/0364142 | A1 | 12/2015 | Sankaranarayanan |

FOREIGN PATENT DOCUMENTS

| | | |
|---|---|---|
| JP | 10222337 A | 8/1998 |
| JP | 11337362 A | 12/1999 |
| JP | 2001222293 A | 8/2001 |
| JP | 2004234273 A | 8/2004 |
| JP | 2005027885 A | 2/2005 |
| JP | 2008102384 A | 5/2008 |
| JP | 2012185861 A | 9/2012 |
| JP | 2013041580 A | 2/2013 |
| KR | 20130068303 A | 6/2013 |
| WO | 2013061857 A1 | 5/2013 |

OTHER PUBLICATIONS

Notification of Reasons for Refusal for corresponding JP Application No. 2016-555123, 9 pages, dated Aug. 8, 2017.
International Search Report for corresponding PCT Application No. PCT/JP2015/074188, 6 pages, dated Nov. 10, 2015.
International Search Report for related PCT Application No. PCT/JP2015/065133, 4 pages, dated Aug. 11, 2015.
International Preliminary Report on Patentability and Written Opinion for related PCT Application No. PCT/JP2015/065133, 14 pages, dated May 4, 2017.
Office Action for related KR Application No. 1020177007237, 9 pages, dated Feb. 27, 2018.
Supplementary European Search Report for related EP Application No. 15853373.7, 10 pages, dated May 11, 2018.
Office Action for related U.S. Appl. No. 15/503,876, 14 pages, dated Oct. 31, 2018.
Office Action for related U.S. Appl. No. 15/503,876, 17 pages, dated May 6, 2019.

* cited by examiner

FIG.6A

|  | SYSTEM PROGRAM | VOICE CHAT MODULE | GAME PROGRAM |
|---|---|---|---|
| SHARED YES/NO INFORMATION | EXCLUSIVE | SHARED | SHARED |
| PRIORITY INFORMATION | 10 | 30 | 20 |

FIG.6B

|  | SYSTEM PROGRAM | VOICE CHAT MODULE | GAME PROGRAM |
|---|---|---|---|
| SHARED YES/NO INFORMATION | EXCLUSIVE | SHARED | SHARED |
| PRIORITY INFORMATION | 40 | 30 | 20 |

CONTROL DEVICE, CONTROL METHOD, PROGRAM AND INFORMATION STORAGE MEDIUM

TECHNICAL FIELD

The present invention relates to a control device, a control method, a program, and an information storage medium.

BACKGROUND ART

Technologies are available that accept voice input by a user, identify a command that matches with a recognition result of the voice, and perform a process that matches with the identified command.

SUMMARY

Technical Problem

A plurality of programs may be installed in an information processing device such as game console or personal computer. For example, a game program may be installed in an information processing device together with a system program such as operating system. The game program is executed separately from the system program. Then, each of the plurality of programs installed in the information processing device may be able to perform a process using voice accepted.

It is assumed, for example, that not only the system program but also the game program installed in the information processing device are both capable of identifying a command that matches with a recognition result of the voice accepted and performing a process that matches with the command identified. Then, it is assumed that the commands associated with the same voice are set independently in the system program and the game program, that is, that a command conflict is taking place. In this case, when the voice is accepted, each of the system program and the game program can identify the command independently of each other. As a result, each of the system program and the game program can perform a process independently of each other. This leads, for example, to a possibility that despite the fact that the user has an intention to perform a process in the system program, a process may be performed in the game program in addition to the process in the system program.

Thus, in an information processing device with a plurality of programs installed therein capable of performing a process using input voice, there is a possibility that a process different from a desired process may be performed in response to a voice input.

The present invention has been devised in light of the above problem, and it is an object of the present invention to provide a control device that prevents performance of a process different from a desired process in response to a voice input, a control method, a program, and an information storage medium.

Solution to Problem

In order to solve the above problem, a control device according to the present invention includes a voice acceptance section adapted to accept voice, and an output control section adapted to perform control such that voice accepted by the voice acceptance section is output to a program capable of performing a process using the voice, wherein the output control section performs control such that if it is recognized that the voice accepted by the voice acceptance section represents given information, voice accepted by the voice acceptance section thereafter is not output to the program.

Further, a control method according to the present invention includes a step of accepting voice, a step of performing control such that voice accepted is output to a program using the voice, and a step of performing control such that if it is recognized that the voice accepted represents given information, voice accepted thereafter is not output to the program.

Still further, a program according to the present invention causes a computer to perform a procedure of accepting voice, a procedure of performing control such that voice accepted is output to a program using the voice, and a procedure of performing control such that if it is recognized that the voice accepted represents given information, voice accepted thereafter is not output to the program.

Still further, a storage medium according to the present invention is a computer-readable storage medium storing a program, the program causing a computer to perform a procedure of accepting voice, a procedure of performing control such that voice accepted is output to a program using the voice, and a procedure of performing control such that if it is recognized that the voice accepted represents given information, voice accepted thereafter is not output to the program.

In one mode of the present invention, the output control section performs control such that voice data representing voice accepted by the voice acceptance section is output to a program that uses the voice data, and the output control section performs control such that if it is recognized that the voice accepted by the voice acceptance section represents given information, voice data representing silence is output to the program thereafter rather than voice data representing the voice accepted by the voice acceptance section.

Further, in one mode of the present invention, the program is a program that runs separately and independently of a voice recognition section that recognizes the voice.

Still further, in one mode of the present invention, the output control section controls whether or not the voice accepted by the voice acceptance section is output to a program capable of performing a process using the voice based on a result of comparison between a priority set for the program and a priority set for a system program.

BRIEF DESCRIPTION OF DRAWINGS

FIG. 6A is a diagram illustrating an example of priority data.

FIG. 6B is a diagram illustrating an example of priority data.

DESCRIPTION OF EMBODIMENT

An embodiment of the present invention will be described in detail below with reference to the accompanying drawings.

Figure 1:
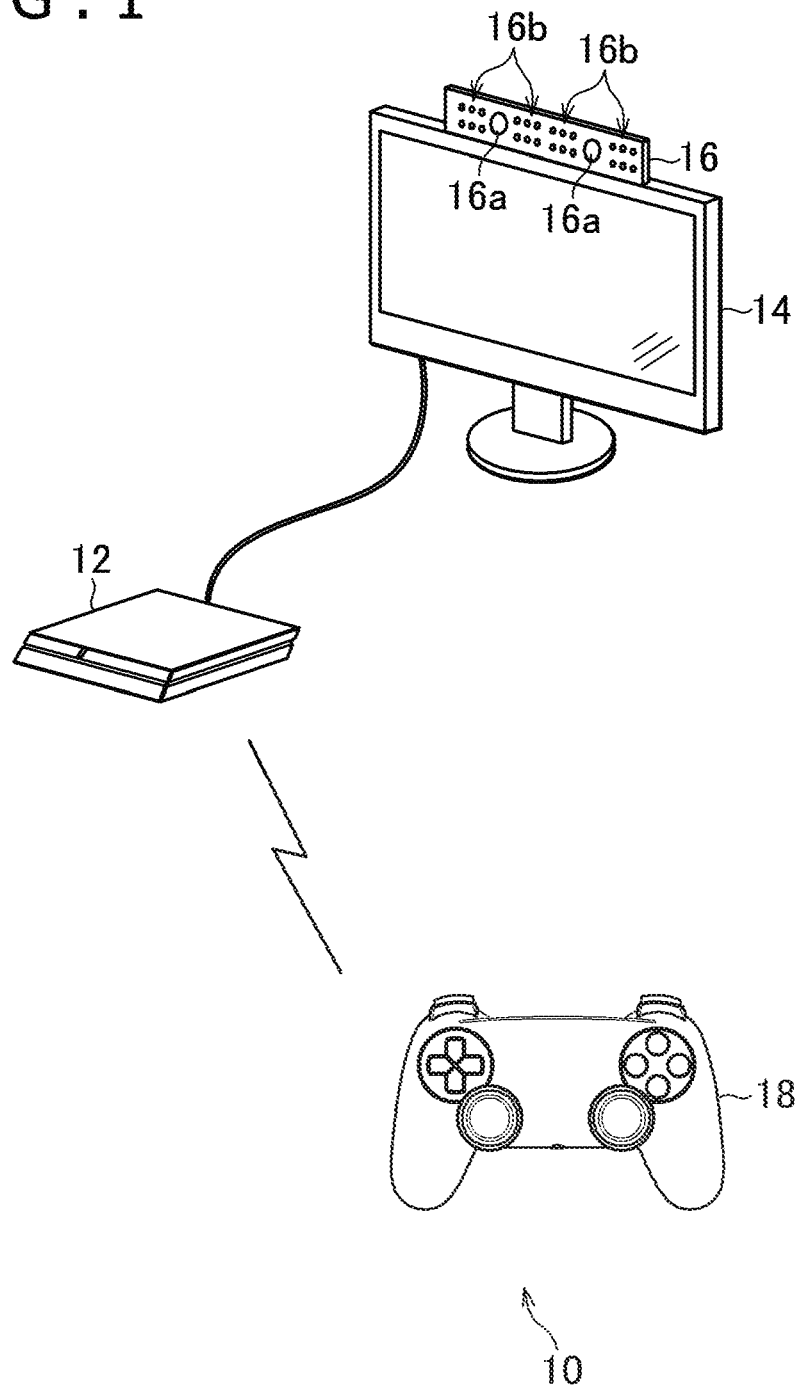
FIG. 1 is a diagram illustrating an example of an overall configuration of an information processing system according to an embodiment of the present invention.

FIG. 1 is a diagram illustrating an example of an overall configuration of an information processing system 10 according to the embodiment of the present invention. As illustrated in FIG. 1, the information processing system 10 according to the present embodiment includes an information processing device 12, a display 14, a camera/microphone unit 16, and a controller 18.

Figure 2:
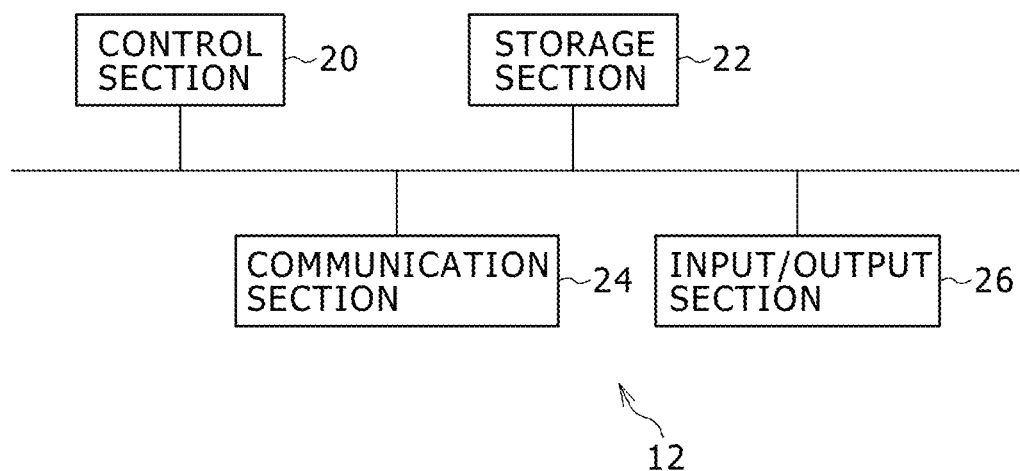
FIG. 2 is a diagram illustrating an example of a hardware configuration of an information processing device according to the embodiment of the present invention.

The information processing device 12 according to the present embodiment is, for example, a computer such as game console or other entertainment device and includes, for example, a control section 20, a storage section 22, a communication section 24, and an input/output section 26 as illustrated in FIG. 2. The control section 20 is a program-controlled device such as central processing unit (CPU) that operates in accordance with a program, for example, installed in the information processing device 12. The control section 20 according to the present embodiment also includes a graphics processing unit (GPU) that draws images in a frame buffer based on graphics commands and data supplied from the CPU. The storage section 22 is, for example, a storage element such as read only memory (ROM) and random access memory (RAM) and a hard disk drive. The storage section 22 stores programs to be executed by the control section 20 or the like. Further, the storage section 22 according to the present embodiment has a frame buffer area reserved for the GPU to draw images. The communication section 24 is, for example, a communication interface such as Ethernet (registered trademark) module or wireless local area network (LAN) module. The input/output section 26 is an input/output port such as high-definition multimedia interface (HDMI) (registered trademark) port or universal serial bus (USB) port.

The display 14 according to the present embodiment is a liquid crystal or other display, showing a screen generated by the information processing device 12. Further, the display 14 according to the present embodiment also includes a speaker that outputs voice represented by voice data generated by the information processing device 12. The camera/microphone unit 16 according to the present embodiment includes, for example, a camera 16a and a microphone 16b. The camera 16a outputs a captured image of a subject to the information processing device 12. The microphone 16b acquires ambient voice, converts the voice into voice data, and outputs the data to the information processing device 12.

The information processing device 12 and the display 14 are connected to each other, for example, with an audio visual (AV) cable or an HDMI cable. The information processing device 12 and the camera/microphone unit 16 are connected to each other, for example, with a USB cable, an AV cable, or an HDMI cable.

The controller 18 according to the present embodiment is an operation input device designed to make an operation input to the information processing device 12. The controller 18 according to the present embodiment has, for example, operators such as buttons, touch panel, and operating sticks. Further, the controller 18 according to the present embodiment includes a gyro sensor, an acceleration sensor, and other sensors. The gyro sensor detects angular speed. The acceleration sensor detects acceleration. Still further, the controller 18 according to the present embodiment has a jack so that if a plug of the microphone is inserted into the jack, voice input is possible through the microphone. Voice input to the microphone that is inserted into the controller 18 is converted into voice data in the controller 18 and output to the information processing device 12.

In the present embodiment, as a user inputs voice to the microphone 16b included in the camera/microphone unit 16 or a microphone connected to the controller 18, the information processing device 12 recognizes the voice. Then, if the recognition is successful, the information processing device 12 according to the present embodiment can identify the command that matches with the recognition result of the voice input to the information processing device 12 (voice accepted by the information processing device 12). Then, the information processing device 12 according to the present embodiment performs the process that matches with the identified command. Thus, in the present embodiment, the user can operate the information processing device 12 by voice. It should be noted that, in the present embodiment, when the microphone plug is inserted in the jack of the controller 18, the recognition result of the voice input to the microphone is handled with priority over the recognition result of the voice input to the microphone 16b of the camera/microphone unit 16.

Further, the user can make various operation inputs using the controller 18 by pressing the buttons and tilting the operating sticks. Then, in the present embodiment, the controller 18 outputs input data associated with the operation input to the information processing device 12.

Still further, the controller 18 according to the present embodiment includes a USB port. When connected to the information processing device 12 with a USB cable, the controller 18 can output input data to the information processing device 12 via the input/output section 26 in a wired manner. Still further, the controller 18 according to the present embodiment includes a wireless communication module and so on. As a result, the controller 18 can output input data to the information processing device 12 via the communication section 24 in a wireless manner.

Figure 3:
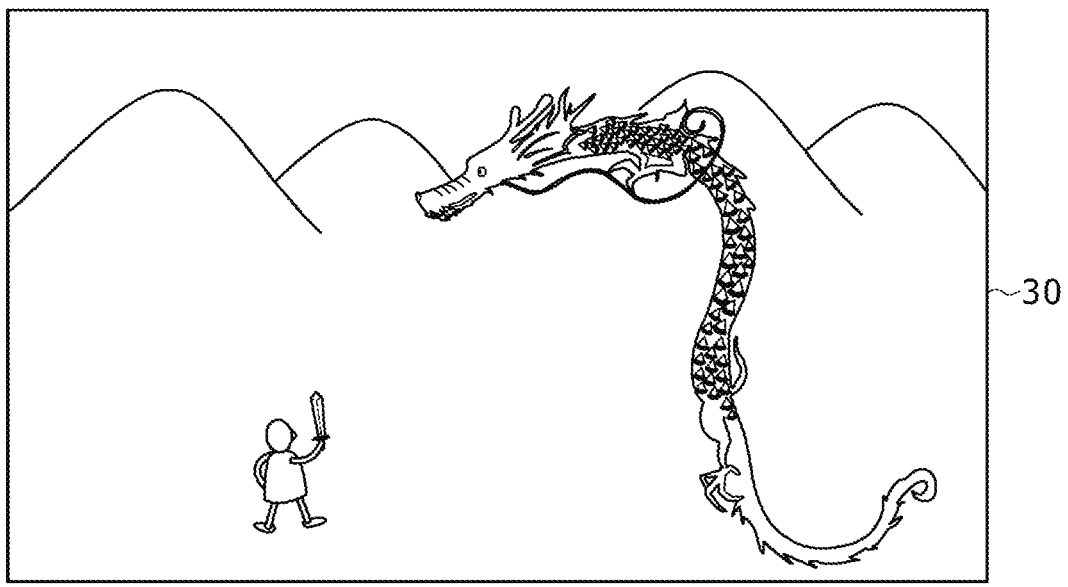
FIG. 3 is a diagram illustrating an example of a playing screen.

FIG. 3 is a diagram illustrating an example of a playing screen 30 showing playing details of a game played by the user of the information processing device 12 according to the present embodiment. A system program 40 and a game program 42 are installed in the information processing device 12 according to the present embodiment (refer to FIG. 5). Then, when the playing screen 30 illustrated in FIG. 3 is shown on the display 14, the user can input a game-related command by voice. It is assumed here that the game-related command refers, for example, to a command that causes a matching process to be performed by the game program 42 in response to a voice input. When voice is input by the user, the game program 42 identifies the command that matches with the voice and performs the game-related process that matches with the command. In the present embodiment, for example, if voice representing the phrase "home screen" is input while the playing screen 30 illustrated in FIG. 3 is shown on the display 14, the screen shown on the display 14 switches to the home screen of the game.

It is assumed here that the information processing device 12 accepts, for example, voice representing a given phrase for starting voice recognition in the system program 40 such as "Start voice recognition." The given phrase representing voice for starting voice recognition in the system program 40 will be hereinafter referred to as a magic word. Then, in the present embodiment, the playing screen 30 shown switches to the state illustrated in FIG. 4. In the state illustrated in FIG. 4, the playing screen 30 contains a voice input guide image 32 for guiding the user about voice to be input. The voice input guide image 32 contains phrases representing system-related commands. It is assumed here that the system-related commands refer, for example, to commands that cause matching processes to be performed by the system program 40 in response to a voice input.

In the present embodiment, if the user inputs voice that represents a phrase contained in the voice input guide image 32 while the playing screen 30 contains the voice input guide image 32, the system program 40 identifies the command represented by the voice based on the voice recognition result. Then, the system program 40 performs the process that matches with the command. For example, in the example illustrated in FIG. 4, when the information processing device 12 accepts voice representing the phrase "home screen," the screen shown on the display 14 switches to the home screen of the system that contains a menu for selecting a program to be executed by the information processing device 12. The home screen is a screen generated by the system program 40.

Further, even if voice representing a system-related command whose phrase is not contained in the voice input guide image 32 is input, the information processing device 12 according to the present embodiment performs the process that matches with the command. For example, if voice representing the phrase "capture a screenshot" is input while the playing screen 30 illustrated in FIG. 4 is shown, a captured image obtained by capturing what appears in the playing screen 30 as a still image is stored in the storage section 22 of the information processing device 12.

It should be noted that the system-related commands are not limited to the command for showing the system's home screen and the command for capturing a screenshot described above. For example, a command for broadcasting a video showing game playing details, a command for storing video clips, and a command for logging in and so on also correspond to the system-related commands.

Figure 4:
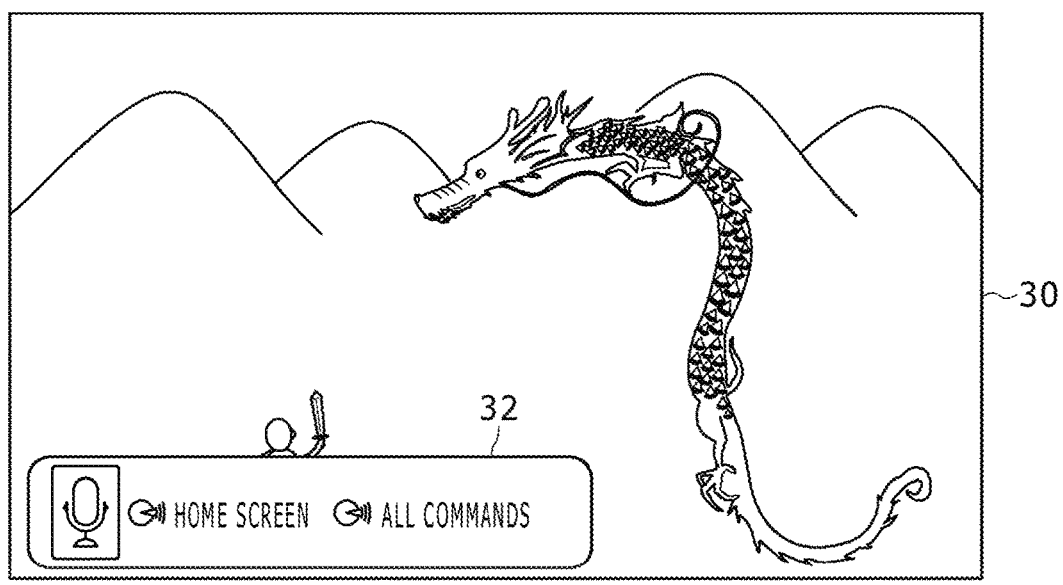
FIG. 4 is a diagram illustrating an example of a playing screen.

Then, in the present embodiment, if no voice with a given volume or more is input for a given time period or more while the playing screen 30 illustrated in FIG. 4 is shown, the playing screen 30 shown switches to the state illustrated in FIG. 3.

As described above, in the present embodiment, there is a conflict of commands to show the "home screen" between the game program 42 and the system program 40. It is assumed here, for example, that if the user inputs a game-related command by voice while the playing screen 30 illustrated in FIG. 4 is shown on the display 14, the game program 42 performs the process that matches with the voice. If so, then there is a possibility that if voice representing the phrase "home screen" is input while the playing screen 30 illustrated in FIG. 4 is shown on the display 14, for example, the screen shown on the display 14 may switch to the home screen of the game. This results in the desired process of showing the home screen of the system not being performed.

For this reason, in the present embodiment, even if the user inputs a game-related command by voice while the playing screen 30 illustrated in FIG. 4 is shown on the display 14, the game program 42 does not perform the process that matches with the voice. Therefore, when the information processing device 12 accepts voice representing the phrase "home screen" in the example of FIG. 4, for example, the screen shown on the display 14 reliably switches to the home screen of the system.

In the present embodiment, on the other hand, even if the user inputs a system-related command by voice while the playing screen 30 illustrated in FIG. 3 is shown on the display 14, the system program 40 does not perform the process that matches with the voice.

Thus, the present embodiment prevents performance of a process different from a desired process in response to a voice input.

A further detailed description will be given below of the above control with reference to FIG. 5.

Figure 5:
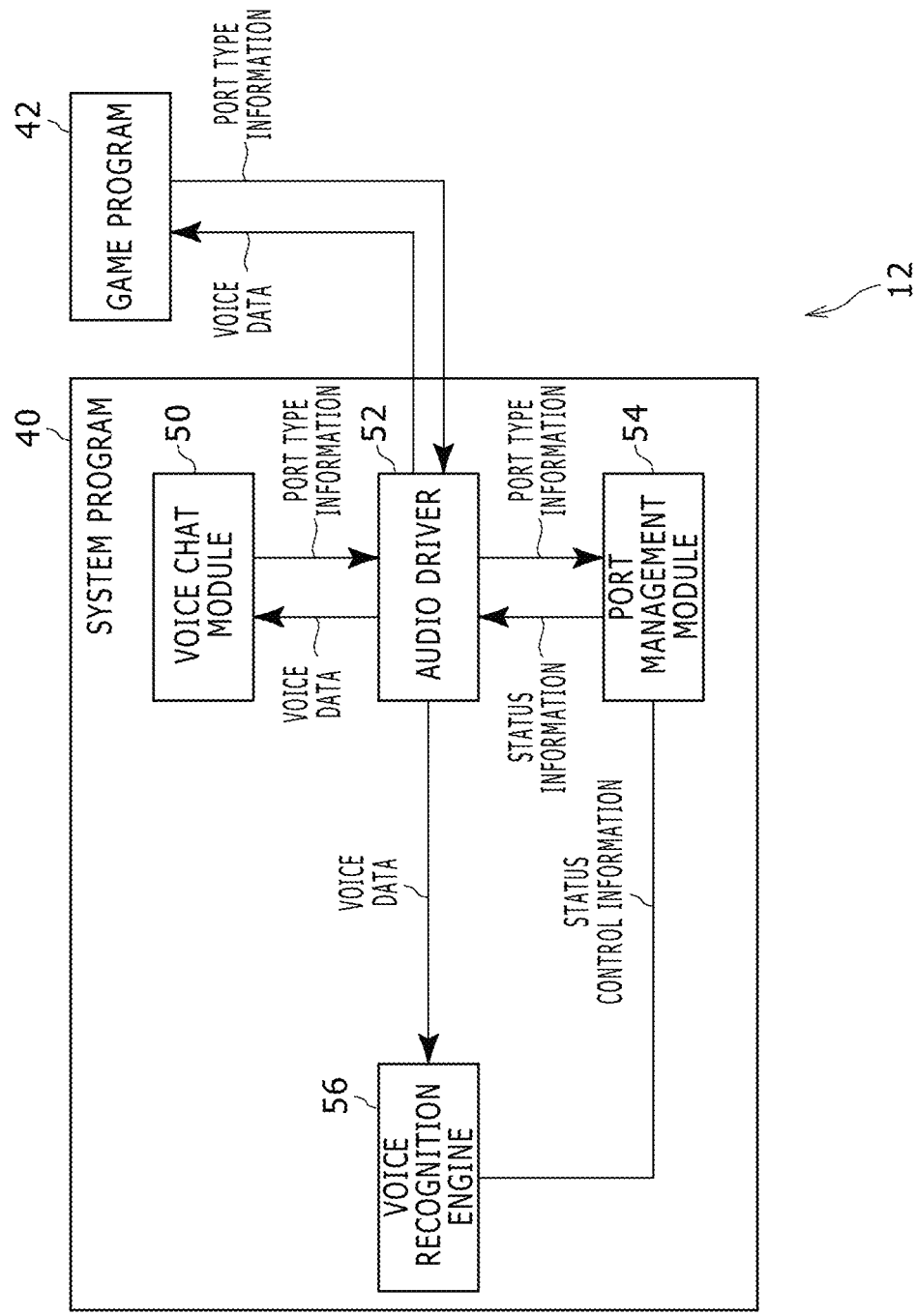
FIG. 5 is an explanatory diagram describing examples of programs that run in the information processing device according to the embodiment of the present invention.

FIG. 5 is an explanatory diagram describing examples of programs that run in the information processing device 12 according to the present embodiment. The system program 40 and the game program 42 are installed in the information processing device 12 according to the present embodiment as described above. In the present embodiment, the system program 40 and the game program 42 are independent of each other, and the game program 42 runs on the system program 40. The home screen of the system is generated and shown on the display 14 as a result of execution of the system program 40 by the information processing device 12. On the other hand, the playing screen 30 illustrated in FIG. 3 and FIG. 4 and the home screen of the game are generated and shown on the display 14 as a result of execution of the game program 42 by the information processing device 12.

As illustrated in FIG. 5, the system program 40 according to the present embodiment includes, for example, a voice chat module 50, an audio driver 52, a port management module 54, and a voice recognition engine 56. It should be noted that other modules may also be included in the system program 40 according to the present embodiment.

If the game program 42 according to the present embodiment is a program that uses a microphone, the game program 42 is implemented such that port type information indicating for which application the microphone is used is output to the audio driver 52. It is assumed that port type information according to the present embodiment takes on one of the values "voice recognition," "voice chat," and "general." It is assumed, for example, that a game-related command that matches with input voice is identified, and that the process that matches with the command is performed in the game program 42 as described above. In this case, the game program 42 is implemented such that port type information having the value "voice recognition" is output to the audio driver 52. Further, if voice chat is performed in the game program 42, the game program 42 is implemented such that port type information having the value "voice chat" is output to the audio driver 52. Still further, if the game program 42 is, for example, a karaoke game program that amplifies input voice and outputs the voice from a speaker, the game program 42 is implemented such that port type information having the value "general" is output to the audio driver 52. In the description given below, it is assumed that the game program 42 is implemented such that port type information having the value "voice recognition" is output to the audio driver 52.

The voice chat module 50 is a module that allows the user of the information processing device 12 to engage in voice chat with other users by voice. In the present embodiment, an application program is included as part of the system program 40, and the voice chat module 50 is an example of such an application program. It should be noted that the system program 40 may include an application program other than the voice chat module.

In the present embodiment, it is assumed that the voice chat module 50 is also implemented such that port type information is output to the audio driver 52 as with the game program 42. It is assumed here, for example, that the voice chat module 50 is implemented such that port type information having the value "voice chat" is output to the audio driver 52.

The audio driver 52 is a driver that accepts voice input to the information processing device 12 via the microphone 16b or the microphone connected to the controller 18. In the present embodiment, for example, the microphone 16b and the microphone connected to the controller 18 convert accepted voice into voice data. Then, the audio driver 52 accepts the voice data converted as described above. Then, the audio driver 52 according to the present embodiment can output the accepted voice data to the game program 42, the voice chat module 50, and the voice recognition engine 56. When the voice data is accepted, each of the game program 42, the voice chat module 50, and the voice recognition engine 56 performs a variety of processes using the voice data.

Further, in the present embodiment, when port type information is accepted from a program, the audio driver 52 associates the port type information with identification information of the program and outputs the port type information to the port management module 54. Then, the port management module 54 holds the port type information associated with the identification information of the program.

In the present embodiment, for example, the port management module 54 is a program that controls output of voice data by the audio driver 52. In the present embodiment, the port management module 54 outputs, to the audio driver 52, status information indicating the status of a port used by the program to which the audio driver 52 outputs voice data. In the present embodiment, it is assumed, for example, that identification information of a program to which voice data is to be output is associated with status information indicating the status of the port used by the program. It should be noted that, in the present embodiment, voice data is output to the game program 42, the voice chat module 50, and the voice recognition engine 56.

Further, in the present embodiment, the port management module 54 holds status information that is output last, that is, status information indicating the latest status.

When status information is accepted from the port management module 54, the audio driver 52 controls, in accordance with the status indicated by the status information, the supply of voice data to the program associated with the status.

It is assumed, for example, that the audio driver 52 accepts status information having the value "1" from the port management module 54. In this case, in the present embodiment, it is assumed that the audio driver 52 outputs, to the program associated with the status information, voice data representing the voice accepted from the microphone. On the other hand, for example, it is assumed that the audio driver 52 accepts the status information having the value "0" from the port management module 54. In this case, in the present embodiment, it is assumed that the audio driver 52 does not output, to the program associated with the status information, voice data representing the voice accepted from the microphone.

Then, in the present embodiment, if voice data representing the voice accepted from the microphone is not output to the program, voice data representing silence is output to the program instead. In the present embodiment, therefore, no special implementation is necessary to deal with a case in which control is performed such that voice data representing the voice accepted from the microphone is not output to the program to which voice data is to be output. This prevents complication involved in implementation of the program to which voice data is to be output. It should be noted that if voice data representing the voice accepted from the microphone is not output to a program, the output itself of voice data to the program may be cancelled.

The voice recognition engine 56 is, for example, the known voice recognition engine 56 and recognizes voice data accepted from the audio driver 52. If the recognition of voice represented by the voice data is successful, the voice recognition engine 56 identifies the command that matches with the voice recognition result. In the present embodiment, the voice recognition engine 56 identifies system-related commands.

In the present embodiment, on the other hand, the identification of game-related commands in response to voice input is handled by a program that runs separately and independently of the voice recognition engine 56. In the present embodiment, it is assumed, for example, that the identification of game-related commands is handled by a module that is implemented separately from the voice recognition engine 56 as part of the game program 42 and that is capable of identifying a command that matches with a voice recognition result.

Then, in the present embodiment, when the information processing device 12 accepts voice representing a magic word, the audio driver 52 accepts voice data representing the voice as described above. Then, the voice data is output to the voice recognition engine 56 as described above. Then, in the present embodiment, the voice recognition engine 56 outputs, to the port management module 54, status control information for starting voice recognition in the system program 40.

Then, the port management module 54 determines the latest status information value based on the status control information accepted from the voice recognition engine 56. The status information value held by the port management module 54 is updated to the value determined in this manner. Then, the port management module 54 outputs, to the audio driver 52, status information in which the determined latest value is set. The audio driver 52 controls, in accordance with the status indicated by the status information, the supply of voice data to the program associated with the status.

In the present embodiment, the status information value is determined based on priority data illustrated in FIG. 6A and FIG. 6B. FIG. 6A is a diagram illustrating an example of priority data when the playing screen illustrated in FIG. 3 is shown. FIG. 6B is a diagram illustrating an example of priority data when the playing screen illustrated in FIG. 4 is shown.

As illustrated in FIG. 6A and FIG. 6B, priority data is associated with the program to which voice data is to be output. Then, priority data includes shared yes/no information and priority information. Shared yes/no information is information indicating whether or not to permit voice data to be output to other programs. In the present embodiment, for example, "shared" is set as a value of shared yes/no information for a program that permits voice data to be output to other programs. On the other hand, in the present embodiment, for example, "exclusive" is set as a value of shared yes/no information for a program that does not permit voice data to be output to other programs. Priority information is data representing the extent of priority given to the output of voice data, and the larger the value, the higher the priority with which voice data is output.

It should be noted that the values of shared yes/no information and priority information of the program associated with the above port type information accepted by the port management module 54 may be determined based on the port type information. In the example illustrated in FIG. 6A and the example illustrated in FIG. 6B, the value of priority information of the voice chat module 50 is larger than the value of priority information of the game program 42. However, the value of priority information of the game program 42 may be larger than the value of priority information of the voice chat module 50.

In the example of FIG. 6A, both the voice chat module 50 with the largest priority information value and the game program 42 with the second largest priority information value have the value "shared" as shared yes/no information. In this case, therefore, control is performed such that voice data is output to all the three programs including the system program 40 from the audio driver 52. That is, status information having the value "1" is output to the audio driver 52 from the port management module 54.

It is assumed here that the port management module 54 accepts, from the voice recognition engine 56, status control information for starting voice recognition in the system program 40 as described above. In this case, the port management module 54 changes the priority value of the system program 40 from "10" to "40." FIG. 6B illustrates priority data after the change. As a result, the program with the largest priority information value is the system program 40. Then, the shared yes/no information value of the system program 40 is "exclusive." In this case, therefore, control is performed such that voice data representing the voice accepted by the audio driver 52 from the microphone is not output to the voice chat module 50 and the game program 42. That is, status information having the value "0" associated with the voice chat module 50 and status information having the value "0" associated with the game program 42 are output from the port management module 54 to the audio driver 52. It should be noted that, in this case, the audio driver 52 may output voice data representing silence as described above.

It should be noted that when voice is accepted that represents a given phrase representing voice for increasing the priority information value of a specific program, the priority information value of the program may be increased.

Further, the priority information value may be, for example, a rank such as "high," "medium," or "low" rather than a numerical value. Then, control may be performed such that voice data is output to the program whose priority information represents the highest rank from the audio driver 52. It should be noted that if there are a plurality of programs whose priority information represents the highest rank, control may be performed such that voice data is output to the plurality of programs from the audio driver 52.

Further, for example, priority data may be associated with a type of the program to which voice data is to be output. Then, the value of status information of the program may be determined based on priority data associated with the type of the program to which voice data is to be output.

Still further, in the example of FIG. 6A, the value of shared yes/no information of the system program 40 may be "shared." Then, the value of shared yes/no information of the system program 40 may be changed to "exclusive," and the priority value of the system program 40 may be changed from "10" to "40" in response to acceptance of the above status control information.

It should be noted that the manner in which the status information value is determined is not limited to the above. For example, control may be performed such that voice data representing the voice accepted by the audio driver 52 from the microphone is not output to the program whose port type information is "voice recognition" when the above status control information is accepted from the voice recognition engine 56. This prevents any command conflict in voice recognition between the program and the system program 40.

Further, for example, control may be performed such that voice data representing the voice accepted from the microphone is not output to the program whose port type information is "voice chat" when the above status control information is accepted from the voice recognition engine 56. This prevents any output of a voice recognition command by the system program 40 to the information processing device 12 used by the user who is the voice chat partner.

A further description will be given below of the functions implemented by the information processing device 12 and the processes performed by the information processing device 12 in relation to voice data output control.

Figure 7:
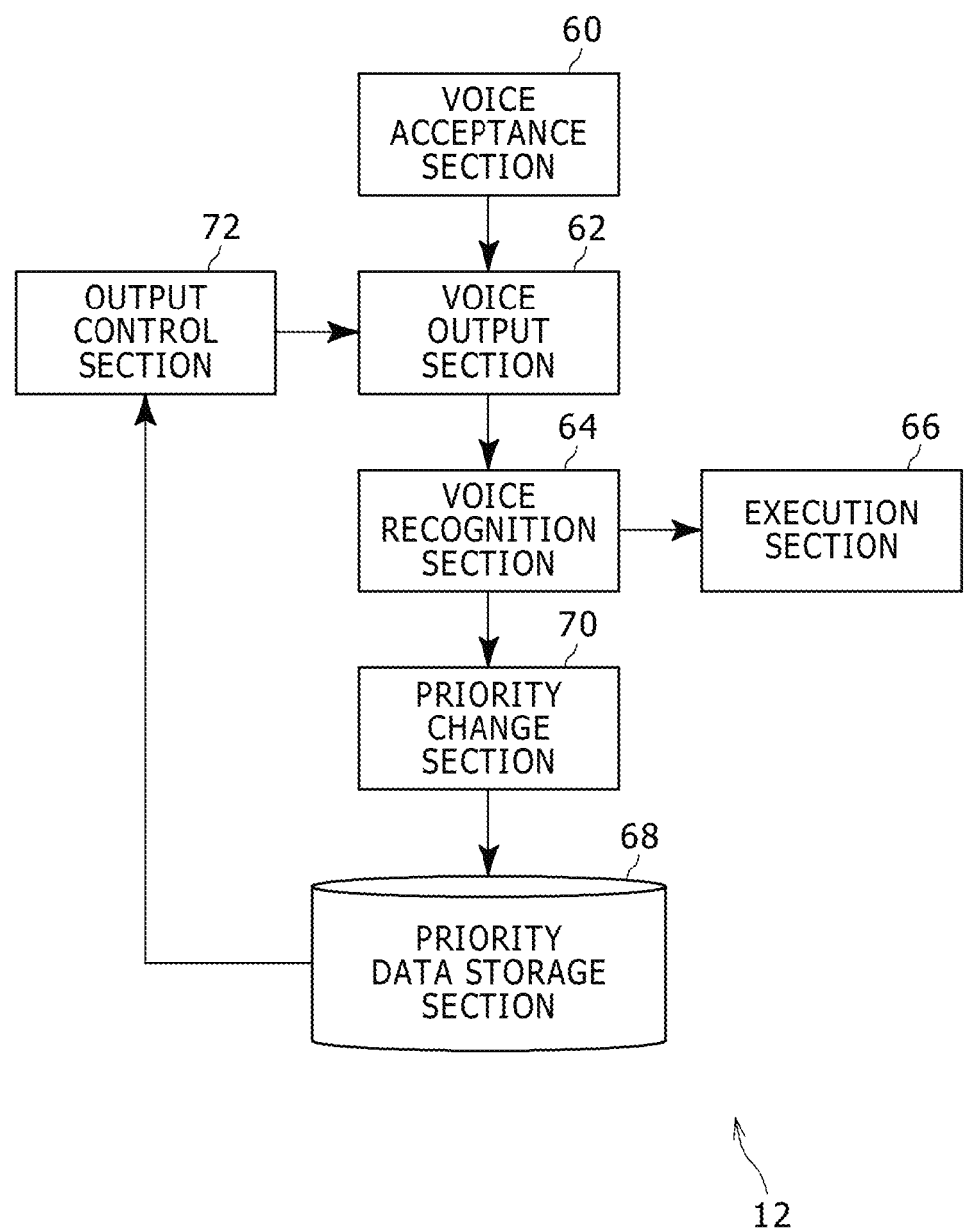
FIG. 7 is a functional block diagram illustrating an example of functions implemented by the information processing device according to the embodiment of the present invention.

FIG. 7 is a functional block diagram illustrating an example of functions implemented by the information processing device 12 according to the present embodiment in relation to voice data output control. It should be noted that, in the information processing device 12 according to the present embodiment, there is no need to implement all the functions illustrated in FIG. 7, and that functions other than those illustrated in FIG. 7 may be implemented.

As illustrated in FIG. 7, the information processing device 12 according to the present embodiment functionally includes a voice acceptance section 60, a voice output section 62, a voice recognition section 64, an execution section 66, a priority data storage section 68, a priority change section 70, and an output control section 72, for example. The voice acceptance section 60 and the output control section 72 are primarily implemented as the input/output section 26. The voice output section 62, the voice recognition section 64, the execution section 66, and the priority change section 70 are primarily implemented as the control section 20. The priority data storage section 68 is primarily implemented as the storage section 22.

The functions of the voice acceptance section 60 and the voice output section 62 correspond, for example, to the functions implemented by the audio driver 52 in FIG. 5. The functions of the priority data storage section 68, the priority change section 70, and the output control section 72 correspond, for example, to the functions implemented by the port management module 54 in FIG. 5. The function of the voice recognition section 64 corresponds, for example, to the function implemented by the voice recognition engine 56 in FIG. 5.

Then, the above functions are implemented as a result of execution of a program that is installed in the information processing device 12, a computer, and that includes instructions that match with the above functions by the control section 20. This program is supplied to the information processing device 12, for example, via a computer-readable information storage medium such as optical disc, magnetic disk, magnetic tape, magneto-optical disk, and flash memory. Alternatively, the program is supplied to the information processing device 12 via communication means such as the Internet.

In the present embodiment, the voice acceptance section 60 accepts voice.

In the present embodiment, the voice output section 62 outputs voice accepted by the voice acceptance section 60 to a program capable of performing a process using the voice. The program to which the voice accepted by the voice acceptance section 60 is output and that is capable of performing a process using the voice will be hereinafter referred to as a target program. In the present embodiment, the game program 42, the voice chat module 50, and the voice recognition engine 56 (voice recognition section 64) correspond to target programs. The target program that has accepted the voice performs various processes using the voice data.

In the present embodiment, the voice recognition section 64 recognizes the voice accepted by the voice acceptance section 60 and identifies the system-related command that matches with the voice. In the present embodiment, the voice recognition section 64 recognizes the voice output from the voice output section 62 and identifies the system-related command that matches with the voice.

The execution section 66 performs the process that matches with the system-related command identified by the voice recognition section 64.

The priority data storage section 68 stores priority data illustrated in FIG. 6A and FIG. 6B.

The priority change section 70 changes priority data stored in the priority data storage section 68 in the manner described above when the voice recognition section 64 recognizes voice representing a magic word.

The output control section 72 performs control such that voice accepted by the voice acceptance section 60 is output to the program capable of performing a process using the voice. In the present embodiment, for example, the output control section 72 outputs the above status information to the voice output section 62. Further, in the present embodiment, the output control section 72 performs control such that if voice accepted by the voice acceptance section 60 is recognized to represent given information, voice accepted by the voice acceptance section 60 thereafter is not output at least to some of the target programs by the voice output section 62. For example, if voice representing a magic word is recognized, the output control section 72 may perform control such that voice accepted by the voice acceptance section 60 thereafter is not output, for example, to the game program 42 and so on as described above. It should be noted that, at this time, the output control section 72 may perform control such that voice data representing silence rather than voice data representing voice accepted by the voice acceptance section 60 is output to the target program to which control is performed such that voice accepted by the voice acceptance section 60 is not output as described above.

Further, the output control section 72 may control whether or not voice accepted by the voice acceptance section 60 is output to the target program based on a result of comparison between the priority set for the target program and the priority set for the system program as described above.

Figure 8:
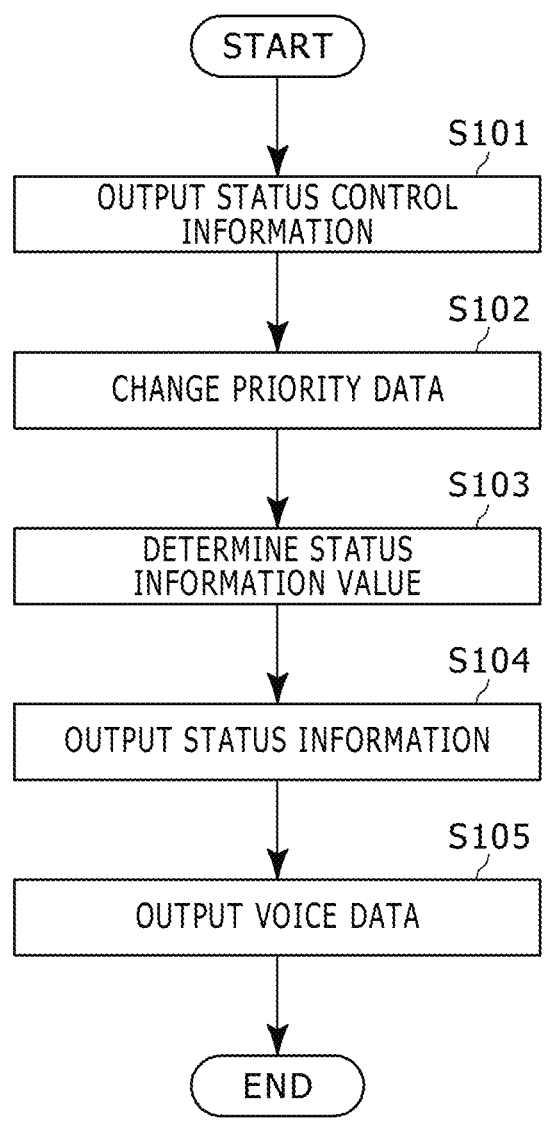
FIG. 8 is a flowchart illustrating an example of a processing flow handled by the information processing device according to the embodiment of the present invention.

A description will be given below of an example of a processing flow handled by the information processing device 12 according to the present embodiment when the voice recognition section 64 recognizes voice representing a magic word with reference to the flowchart illustrated in FIG. 8.

When the voice recognition section 64 recognizes voice representing a magic word, the voice recognition section 64 outputs, to the priority change section 70, status control information for starting voice recognition in the system program 40 (S101). Then, the priority change section 70 changes the priority data stored in the priority data storage section 68 based on the status control information (S102). Then, the output control section 72 determines the status information value based on the updated priority data (S103). Then, the output control section 72 outputs, to the voice output section 62, status information in which the determined value is set (S104). Then, the voice output section 62 that accepts the status information outputs voice data to the target program in accordance with the status represented by the status information (S105). Then, the processes illustrated in the present processing example are terminated.

It should be noted that the present invention is not limited to the above embodiment.

For example, the information processing device 12 may be a portable gaming device that includes the camera 16a and the microphone 16b. Alternatively, the information processing device 12 may be a personal computer, a tablet terminal, a smartphone, a head-mounted display, or other device.

Further, the sharing of roles between the information processing device 12, the display 14, and the camera/microphone unit 16 is not limited to the above. Further, the information processing device 12 may include a plurality of housings.

Still further, the above specific character strings and the numerical values and the specific character strings and the numerical values in the drawings are illustrative, and the character strings and the numerical values are not limited thereto.

The invention claimed is:

1. An apparatus, comprising:
a processing device operating to execute a plurality of programs simultaneously, each program responding to a plurality of user commands to affect execution thereof;
a voice acceptance section adapted to accept voice commands from the user; and
an output control section adapted to perform control such that the voice commands are selectively output to the plurality of programs such that:
(i) when a specific set of the voice commands do not include a predetermined voice command, the specific set of the voice commands are output to the plurality of programs in a predetermined order of priority, whereby the specific set of the voice commands are not output to at least one first of the plurality of programs; and
(ii) when the specific set of the voice commands include the same predetermined voice command, the specific set of the voice commands are output to the plurality of programs in a different order of priority, whereby the specific set of the voice commands are not output to at least one second of the plurality of programs.

2. The apparatus of claim 1, wherein the output control section performs control such that: (i) when the voice commands do not include the predetermined voice command, the at least one first of the plurality of programs receives silence instead of the voice commands; and (ii) when the voice commands include the predetermined voice command, the at least one second of the plurality of programs receives silence instead of the voice commands.

3. The apparatus of claim 1, wherein the plurality of programs run separately and independently of a voice recognition section that recognizes the voice commands.

4. The apparatus of claim 1, wherein the at least one first of the plurality of programs are one or more non-system level program, and the at least one second of the plurality of programs are one or more system level programs.

5. A control method comprising:
executing a plurality of programs simultaneously, each program responding to a plurality of user commands to affect execution thereof;
accepting voice commands from the user; and
selectively outputting the voice commands to the plurality of programs such that:
(i) when a specific set of the voice commands do not include a predetermined voice command, the specific set of the voice commands are output to the plurality of programs in a predetermined order of priority, whereby the specific set of the voice commands are not output to at least one first of the plurality of programs; and
(ii) when the specific set of the voice commands include the same predetermined voice command, the specific set of the voice commands are output to the plurality of programs in a different order of priority, whereby the specific set of the voice commands are not output to at least one second of the plurality of programs.

6. A non-transitory, computer readable storage medium containing a computer program, which when executed by a computer, causes the computer to carry out actions, comprising:
executing a plurality of programs simultaneously, each program responding to a plurality of user commands to affect execution thereof;
accepting voice commands from the user; and
selectively outputting the voice commands to the plurality of programs such that:
(i) when a specific set of the voice commands do not include a predetermined voice command, the specific set of the voice commands are output to the plurality of programs in a predetermined order of priority, whereby the specific set of the voice commands are not output to at least one first of the plurality of programs; and
(ii) when the specific set of the voice commands include the same predetermined voice command, the specific set of the voice commands are output to the plurality of programs in a different order of priority, whereby the specific set of the voice commands are not output to at least one second of the plurality of programs.

* * * * *